No. 703,815. Patented July 1, 1902.
J. E. PAINTER.
KINDERGARTEN LOOM.
(Application filed Feb. 21, 1902.)
(No Model.) 2 Sheets—Sheet 1.
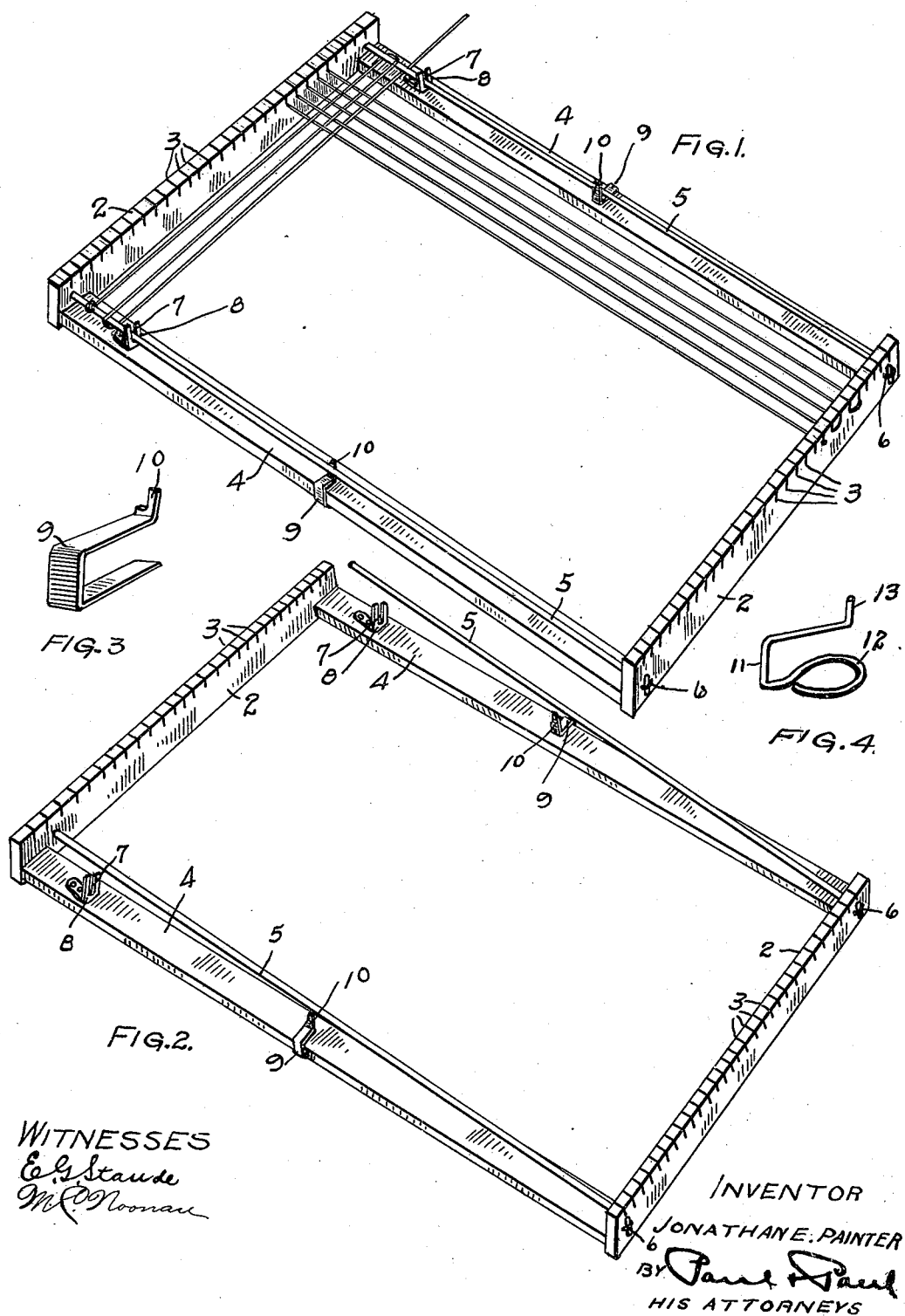
WITNESSES
INVENTOR
JONATHAN E. PAINTER
BY
HIS ATTORNEYS

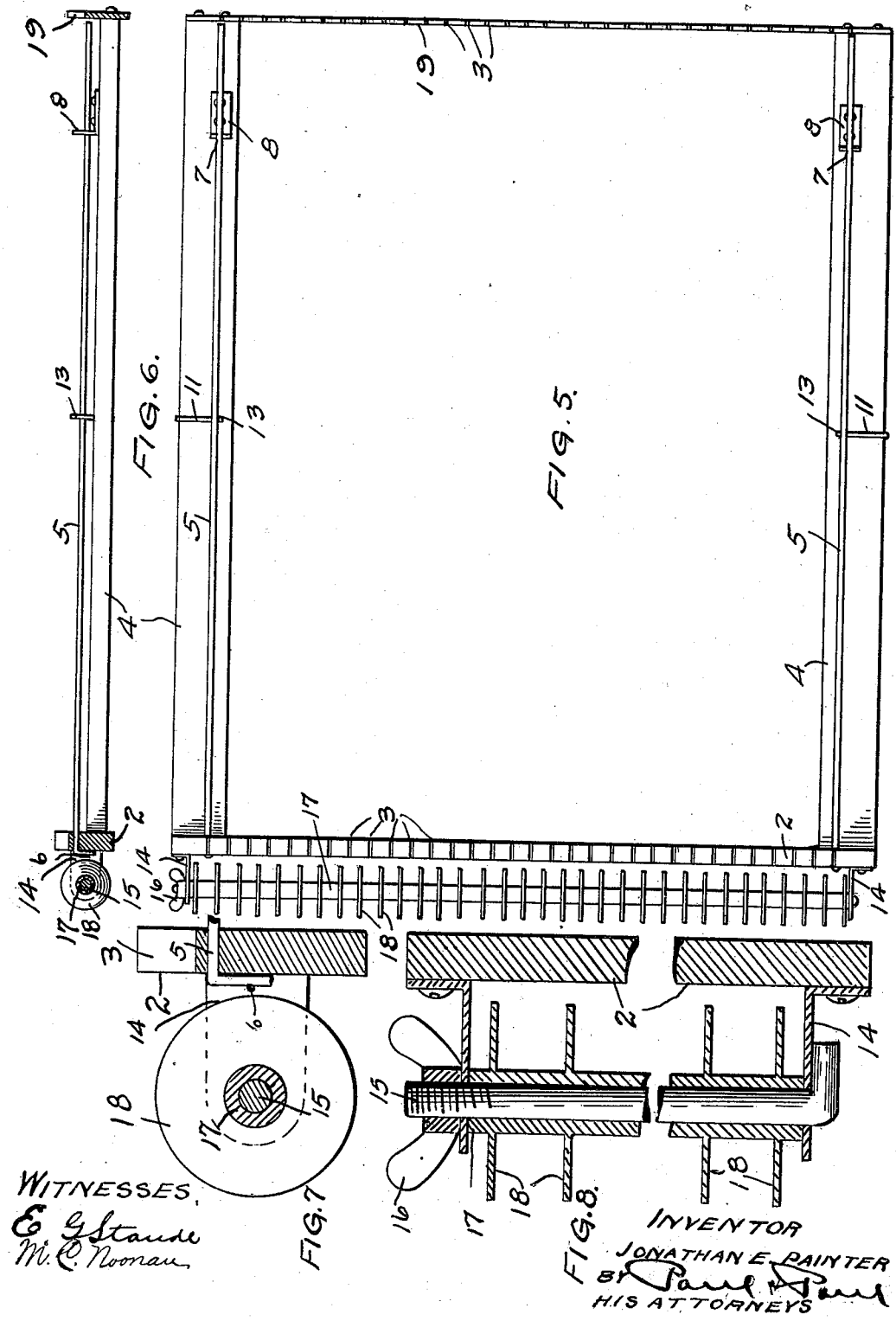

UNITED STATES PATENT OFFICE.

JONATHAN E. PAINTER, OF MINNEAPOLIS, MINNESOTA.

KINDERGARTEN-LOOM.

SPECIFICATION forming part of Letters Patent No. 703,815, dated July 1, 1902.

Application filed February 21, 1902. Serial No. 95,036. (No model.)

*To all whom it may concern:*

Be it known that I, JONATHAN E. PAINTER, of Minneapolis, county of Hennepin, State of Minnesota, have invented certain new and useful Improvements in Kindergarten-Looms, of which the following is a specification.

The object of the invention is to provide an improvement over the loom shown and described in Letters Patent of the United States granted to me April 15, 1902, No. 697,745.

The invention consists generally in a frame having light wires or rods at the sides of the same, around which the cross or weft threads are passed, and clips adjustably carried by said frame and adapted to brace or strengthen said wires.

Further, the invention consists in providing a reel or spool whereon the warp-threads are wound preparatory to weaving.

Further, the invention consists in providing wires secured at one end, the opposite ends being held against lateral movement but being free to be raised to permit the removal of the work.

Further, the invention consists in various constructions and combinations, all as hereinafter described, and particularly pointed out in the claims.

In the accompanying drawings, forming part of this specification, Figure 1 is a perspective view of a loom-frame embodying my invention. Fig. 2 is a similar view with the wires raised to permit the removal of the weave. Figs. 3 and 4 are enlarged details of the adjustable bracing-clips. Fig. 5 is a plan view of a modified construction of loom. Fig. 6 is a longitudinal section. Figs. 7 and 8 are details of the reel or spool provided at one end of the frame.

In the drawings, 2 represents the end pieces or heads of the frame, provided with a series of transverse saw-slits 3, wherein the warp-threads are inserted.

4 represents the fixed side rails or bars connecting the heads 2. Above these bars 4 and opposite the saw-slits at the ends of the heads I provide light flexible wires 5, that are preferably thrust through holes in one of the heads and bent over and secured by staples 6. This manner of securing the wires prevents lengthwise movement in either direction and also prevents them from turning. The wires extend parallel with the bars 4 above the same a sufficient distance to permit convenient weaving of the threads back and forth, and their free ends rest within slots 7, provided in sheet-metal clips 8, that are secured to the top of the bars 4 by screws or in any suitable way. These clips permit the wires to be raised up, as shown in Fig. 2, when it is desired to remove the weave, but prevent any lateral movement of the wires in either direction. Other means for preventing lateral movement of the wires may be employed, if preferred.

It is desirable to make the loops in the weft or cross threads at the sides of the weave as small as possible, and I therefore prefer to use comparatively light wires, around which said threads are passed, and to prevent these wires from bending and causing the weave to be uneven in width I provide clips 9, that are bent to fit over the bars 4 and have upwardly-extending fingers 10, that are just inside the wires and serve to brace or strengthen them against inward bending. These clips are slidable on the bars 4 and are adapted to be moved along the wires as the weaving progresses, or, if preferred, in small frames the clips may be adjusted—as shown, for instance, in Fig. 1—about the middle of the frame and the weaving carried along the wires past the clips without moving them. The use of these clips enables me to use a wire of small gage, thus effecting a considerable saving in the expense and at the same time forming a small loop in the cross-threads and making a neater weave. As soon as the weave has been carried the length of the frame or the desired distance thereon the free ends of the wires are raised out of the slots 7, and the work can then be easily slipped off the wires.

In Fig. 4 I have shown a clip formed from a single piece of wire 11, having a loop 12 at one end to bear upon the under side of the bar 4 and provided at its free end with a finger 13, corresponding in its function to that of the other clip.

It is sometimes desirable to make a weave of considerable length, and in such cases it is necessary to provide a long loom-frame or have some means whereon the warp-threads may be wound and unreeled as the work progresses. In Fig. 5 I have shown one end of the frame provided with brackets 14, in which a rod 15 is mounted. This rod is bent at one end to prevent being drawn through the brackets and is threaded at its opposite end to receive a thumb-nut 16, and between the brackets on said rod I arrange a spool 17, that is provided with a series of disks 18, arranged at intervals and between which the warp-threads are wound, the centers of the spaces between said disks being substantially opposite the saw-slits 3 in the adjacent head of the frame, said slits acting as guides for the warp-threads. The spool is readily removed by slipping out the rod 15, and the warp-threads are then wound on the spool, each of the spaces between the disks being appropriated for a warp-thread. When the desired quantity of thread has been wound on the spool, it is secured in place on the frame, a sufficient length of the threads being unwound to fill the frame. The spool is then prevented from turning by tightening the thumb-nut 16 and the weaving commenced and continued until the frame is full. The work is then slipped off the wires and the frame filled and the weaving continued as before.

When the warp reel or spool is provided in connection with the frame, I prefer to employ a thin metal head 19 at the opposite end of the frame from the spool, so that as the work is carried along one weave after another there will be no appreciable distance between the cross-threads of one weave and those of the adjoining weave. These frames may be of any suitable length and width, according to the size and character of the work to be performed, and by the use of the adjustable bracing-clips I am able to make the loom-frame adapted to weave a fabric of any desired length and still employ side wires of comparatively small gage.

I have shown the spool turned out of a single block; but I may prefer to construct the same of a series of short tubes arranged on the rod with disks of metal or other suitable material placed between them. When made in this way, each warp-thread will be wound as it would on an independent spool and can be unwound without affecting the other threads.

I claim as my invention—

1. In a loom-frame, flexible side wires around which the weft-threads are passed, and clips carried by said frame and adapted to brace said wires against inward bending.

2. In a loom-frame, flexible side wires around which the weft-threads are passed, and adjustable clips provided on said frame and adapted to engage said wires and brace the same against inward bending.

3. A loom-frame, comprising head or end pieces adapted to support the warp-threads, side bars connecting said end pieces, flexible wires secured at one end, the opposite ends of said wires being free to be raised above the adjacent end piece, and slotted clips provided on said side bars and adapted to receive the free ends of said wires and prevent lateral movement thereof.

4. A loom-frame, comprising head or end pieces having saw-slits at intervals to receive the warp-threads, side bars connecting said end pieces, flexible wires around which the weft-threads are passed secured at one end, the opposite ends of said wires being free to be raised to permit the removal of the work therefrom, slotted clips provided on said bars and adapted to receive the free ends of said wires and prevent lateral movement thereof, and bracing-clips provided on said bars to prevent inward bending of said wires.

5. A loom-frame, comprising end pieces having slits to receive the warp-threads, side bars connecting said end pieces, flexible wires or rods secured at one end and free to be raised at the other end, and a spool provided on said frame near the fixed end of said wires and having a series of annular spaces or grooves opposite the slits in the adjacent head and whereon the warp-threads are wound.

6. A loom-frame, comprising heads having a series of slits at intervals adapted to receive the warp-threads, bars connecting said heads, wires or rods secured at one end in one of said heads and free to be raised at the other end, bracing-clips adapted to prevent inward bending of said wires or rods, and a spool provided on said frame near the fixed ends of said wires and whereon the warp-threads are wound.

7. A loom-frame, comprising head or end pieces adapted to support the warp-threads, side bars connecting said end pieces, spring-wires secured at one end, the opposite ends of said wires being free to be raised above the adjacent end piece to permit the removal of the work, and clips carried by said side bars and adapted to brace said wires against inward bending.

8. A loom-frame, comprising head or end pieces to support the warp-threads, side bars connecting said end pieces, spring-wires secured at one end, the opposite ends of said wires being free to be raised above the adjacent end piece to permit the removal of the work, and adjustable clips provided on said side bars and adapted to engage said wires and brace the same against inward bending.

9. A loom-frame, comprising head or end pieces to support the warp-threads, side bars connecting said end pieces, flexible rods or wires secured at one end, and means preventing lateral movement of the opposite ends of said wires but permitting them to be raised above the adjacent end piece to permit the convenient removal of the work from the wires.

In witness whereof I have hereunto set my hand this 17th day of February, 1902.

JONATHAN E. PAINTER.

In presence of—
RICHARD PAUL,
M. C. NOONAN.